(12) United States Patent (10) Patent No.: US 8,010,293 B1
Peng et al. (45) Date of Patent: Aug. 30, 2011

(54) LOCALIZED SEISMIC IMAGING USING DIPLETS

(75) Inventors: Chengbin Peng, Sugar Land, TX (US); Ying Hu, Sugar Land, TX (US); Jianming Sheng, Sugar Land, TX (US)

(73) Assignee: WesternGeco L. L. C., Houston, TX (US)

( * ) Notice: Subject to any disclaimer, the term of this patent is extended or adjusted under 35 U.S.C. 154(b) by 185 days.

(21) Appl. No.: 12/029,842

(22) Filed: Feb. 12, 2008

Related U.S. Application Data (63) Continuation of application No. 11/926,291, filed on Oct. 29, 2007, now abandoned.

(51) Int. Cl.
*G01V 1/00* (2006.01)
(52) U.S. Cl. ......................................................... 702/14
(58) Field of Classification Search .................... 702/14, 702/18
See application file for complete search history.

(56) References Cited

U.S. PATENT DOCUMENTS

| | | | | |
|---|---|---|---|---|
| 4,797,860 | A * | 1/1989 | Quaglino | 367/47 |
| 5,274,605 | A | 12/1993 | Hill | |
| 5,640,368 | A | 6/1997 | Krebs | |
| 6,049,759 | A * | 4/2000 | Etgen | 702/14 |
| 6,055,482 | A * | 4/2000 | Sudhakar et al. | 702/16 |
| 7,072,767 | B2 * | 7/2006 | Routh et al. | 702/14 |
| 7,480,206 | B2 | 1/2009 | Hill | |
| 7,937,224 | B2 * | 5/2011 | Peng | 702/17 |
| 2005/0129324 | A1 * | 6/2005 | Lemke | 382/254 |
| 2005/0135189 | A1 * | 6/2005 | Wang | 367/50 |
| 2005/0207278 | A1 * | 9/2005 | Reshef et al. | 367/38 |
| 2006/0018191 | A1 * | 1/2006 | Kappius et al. | 367/38 |
| 2006/0133206 | A1 * | 6/2006 | Barnes | 367/38 |
| 2006/0227662 | A1 * | 10/2006 | Foy | 367/52 |

OTHER PUBLICATIONS

Ru-Shan Wu and Ling Chen, Wave Propagation and Imaging Using Gabor-Daubechies Beamlets, May 21-25, 2001, the Proceedings of the 5th International Conference on Theoretical and Computational Acoustics.*
R. Nowack and K. Aki, the Two-Dimensional Gaussian Beam Synthetic Method: Testing and Application, Sep. 10, 1984, Journal of Geophysical Research, vol. 89, No. B9, pp. 7797-7819.*

(Continued)

*Primary Examiner* — Aditya Bhat (57) ABSTRACT

Methods, systems, and software for determining a seismic image of a target area are disclosed. The target area is defined by a volume of interest (VOI). The method includes receiving an unmigrated set of spatial wavelets, wherein the unmigrated set of spatial wavelets include unmigrated spatial wavelets in the time domain. The method includes receiving a first migrated set of spatial wavelets, wherein the first migrated set of spatial wavelets includes migrated spatial wavelets in the depth domain. Each spatial wavelet comprises information about spatial location, orientation, amplitude, wavelet, acquisition configuration, and coherency. Each spatial wavelet in the unmigrated set of spatial wavelets is linked to a spatial wavelet in the first migrated set of spatial wavelets. The method includes selecting spatial wavelets from the first migrated set of spatial wavelets that are within or slightly outside the VOI; selecting a target set of spatial wavelets, the target set of spatial wavelets including spatial wavelets from the unmigrated set of spatial wavelets that are linked to the selected spatial wavelets from the first migrated set of spatial wavelets; migrating the target set of spatial wavelets using one or more of a new velocity model to create a second migrated set of spatial wavelets; and synthesizing the second migrated set of spatial wavelets into a new seismic volume and synthesizing the second migrated set of spatial wavelets into one or more new seismic gathers.

23 Claims, 6 Drawing Sheets
(3 of 6 Drawing Sheet(s) Filed in Color)

OTHER PUBLICATIONS

Hennenfent, G. and Herrmann, F.J., Seismic Denoising with Nonuniformly Sampled Curvelets, Apr. 24, 2006, Computing in Science & Engineering, vol. 8, Issue 3, pp. 16-25.*

Albertin, et al., True-Amplitude Beam Migration, SEG International Exposition and 74th Annual Meeting, Oct. 2004.

Gray, Gaussian Beam Migration of Common-Shot Records, SEG International Exposition and 74th Annual Meeting, Oct. 2004.

Nowack, Common-Offset Gaussian Beam Inversion: Final Report, Earth and Atmospheric Sciences, Purdue University, Jul. 2004.

Raz, Beam Stacking: a Generalized Preprocessing Technique, Geophysics, Sep. 1987, pp. 1199-1210, vol. 52, No. 9.

Chavez-Perez, et al., Crustal Imaging in Southern California using Earthquake Sequences, 7th International Symposium on Deep Seismic Profiling of the Continents, Sep. 1996.

Hennenfent, et al., Seismic Denoising with Nonuniformly Sampled Curvelets, Noise and Signal Interaction, IEEE, 2006.

Nowack, et al., the Two-Dimensional Gaussian Beam Synthetic Method: Testing and Application, Journal of Geophysical Research, Sep. 10 1984, pp. 7797-7819, vol. 89, No. B9.

Wu, et al., Wave Propagation and Imaging Using Gabor-Daubechies Beamlets, Modeling and Imaging Laboratory, IGPP, University of California, Oct. 2001.

3D Beam Prestack Depth Migration with Examples from Around the World, Tech Link, a Publication of Petroleum GeoServices, Aug. 2008, pp. 16, vol. 8, No. 8.

Chen, et al., Target-Oriented Beamlet Migration Based on Gabor-Daubechies Frame Decomposition, Geophysics, Mar.-Apr. 2006, pp. S37-S52, vol. 71, No. 2.

Jin, et al., Seismic Depth Migration with Pseudo-Screen Propagator, Computational Geoscience, 1999, pp. 321-335, vol. 3.

Alkhalifah, Gaussian Beam Depth Migration for Anisotropic Media, Geophysics, vol. 60 No. 5, Sep./Oct. 1995, pp. 1474-1484.

Gray, et al., Depth Model Building by Interactive Manual Tomography, SEG Expanded Abstracts, vol. 19, 2000.

Hua, et al., Parsimonious 2D Prestack Kirchhoff Depth Migration, Geophysics, vol. 65 No. 3, May-Jun. 2003, pp. 1043-1051.

Sun, et al., 3D Prestack Kirchoff Beam Migration for Depth Imaging,Geophysics, vol. 65 No. 5, Sep.-Oct. 2009, pp. 1592-1603.

* cited by examiner

LOCALIZED SEISMIC IMAGING USING DIPLETS

CROSS-REFERENCES TO RELATED APPLICATIONS

This application is a continuation of U.S. patent application Ser. No. 11/926,291, filed Oct. 29, 2007, now abandoned entitled "Localized Seismic Imaging Using Diplets," by Ying Hu, et al, which is hereby incorporated by reference. This application is related to U.S. patent application Ser. No. 11/794,795, filed May 17, 2007, entitled "Diplet Demigration and Remigration," by Chengbin Peng, which is hereby incorporated by reference. This application is related to U.S. patent application Ser. No. 11/829,982, filed Jul. 30, 2007, entitled "4D+ Prestack Seismic Data Structure, And Methods And Apparatus For Processing 4d+ Prestack Seismic Data" by Chengbin Peng and Sebastien Vautier, which is hereby incorporated by reference.

BACKGROUND

As subterranean fluid exploration becomes increasingly complex, the importance of analyzing seismic samples increases. Seismic imaging, or migration, is a process that focuses and positions seismic reflections at their true geological locations. Over the years, significant effort has gone into the search for fast and accurate imaging algorithms. See, e.g., Yilmaz, O. 2002, "Seismic data analysis: Processing, Inversion, and interpretation of seismic data", Society of Exploration Geophysicists, Tulsa, Okla. and Claerbout, J. F., 1985, "Imaging the Earth's Interior", Blackwell Scientific Publications, London. Among the various processing methods employed, prestack depth migration is one of the most time intensive to perform. Wave equation and Kirchhoff migration represent two typical groups of algorithms that are widely used within the oil and gas industry.

Target oriented prestack depth migration has also been used where only a small volume of output is produced, but it still takes days, if not weeks, to complete because all, or a significant portion of the input prestack seismic data needs to be migrated. Many wave equation depth migrations cannot be made target oriented, or at least not easily, because of the inherent global nature of the underlying method. Kirchhoff prestack depth migration can be target oriented on output, but all seismic traces within the aperture range must be migrated even though many of them will not contribute to the image in the target area at all.

SUMMARY OF THE INVENTION

In general, in a first aspect, the invention features a method for determining a seismic image of a target area, wherein the target area is defined by a volume of interest (VOI). The method includes receiving an unmigrated set of spatial wavelets, wherein the unmigrated set of spatial wavelets include unmigrated spatial wavelets in the time domain; and receiving a first migrated set of spatial wavelets, wherein the first migrated set of spatial wavelets includes migrated spatial wavelets in the depth domain. Each spatial wavelet comprises information about spatial location, orientation, amplitude, wavelet, acquisition configuration, and coherency. Each spatial wavelet in the unmigrated set of spatial wavelets is linked to a spatial wavelet in the first migrated set of spatial wavelets. The method includes selecting spatial wavelets from the first migrated set of spatial wavelets that are within or slightly outside the VOI; selecting a target set of spatial wavelets, the target set of spatial wavelets including spatial wavelets from the unmigrated set of spatial wavelets that are linked to the selected spatial wavelets from the first migrated set of spatial wavelets; migrating the target set of spatial wavelets using one or more of a new velocity model to create a second migrated set of spatial wavelets; synthesizing the second migrated set of spatial wavelets into a new seismic volume; and synthesizing the second migrated set of spatial wavelets into one or more new seismic gathers.

In general, in a second aspect, the invention features a computer program, stored in a tangible medium, for determining a seismic image of a target area. The target area is defined by a volume of interest (VOI). The computer program includes executable instructions that cause at least one processor to receive an unmigrated set of spatial wavelets, wherein the unmigrated set of spatial wavelets include unmigrated spatial wavelets in the time domain; and receive a first migrated set of spatial wavelets, wherein the first migrated set of spatial wavelets includes migrated spatial wavelets in the depth domain. Each spatial wavelet comprises information about spatial location, orientation, amplitude, wavelet, acquisition configuration, and coherency. Each spatial wavelet in the unmigrated set of spatial wavelets is linked to a spatial wavelet in the first migrated set of spatial wavelets. The computer program includes executable instructions that cause at least one processor to select spatial wavelets from the first migrated set of spatial wavelets that are within or slightly outside the VOI; select a target set of spatial wavelets, the target set of spatial wavelets including spatial wavelets from the unmigrated set of spatial wavelets that are linked to the selected spatial wavelets from the first migrated set of spatial wavelets; migrate the target set of spatial wavelets using one or more of a new velocity model to create a second migrated set of spatial wavelets; synthesize the second migrated set of spatial wavelets into a new seismic volume; and synthesize the second migrated set of spatial wavelets into one or more new seismic gathers.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
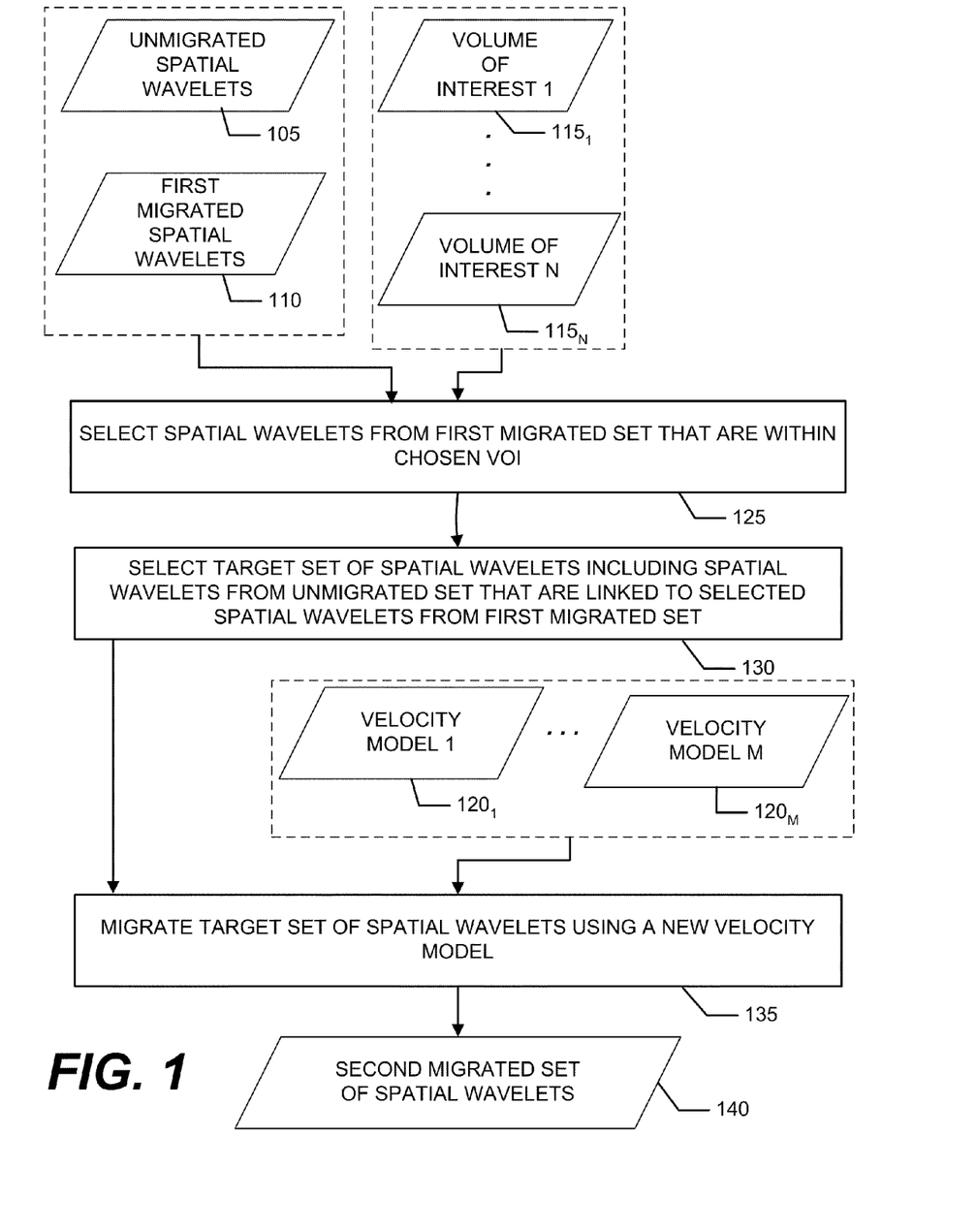
FIGS. 1-2 are flow charts illustrating an example method of the present disclosure.

FIG. 1 is a flow chart of an example method of the present disclosure. The method includes receiving a first set of unmigrated spatial wavelets (block 105) and a set of migrated spatial wavelets (block 110). In certain example implementations, the unmigrated spatial wavelets are in the time domain and the migrated spatial wavelets are in the depth domain. Each of the spatial wavelets includes a link between data elements in the migrated domain and data elements in the unmigrated domain. The combination of the unmigrated spatial wavelets and migrated spatial wavelets may be referred to as a spatial wavelet basket. In one example implementation, the spatial wavelets are diplets, which are discussed in greater detail below. In another example implementations, the spatial wavelets are Gaussian packets, as discussed in Cerveny, V., 2001, "Seismic ray theory", Cambridge University Press, which is incorporated by reference. In general, Gaussian packets are high frequency asymptotic space-time solutions to one or more acoustic wave equations. A Gaussian packet has an approximately Gaussian profile in spatial directions and time.

In another example implementations, the spatial wavelets are curvelets, as discussed in Candes E. J. and Donoho, D. L., 2005, "Continuous curvelet transform: I. resolution of the wavefront set", Applied Computation Harmonic Analysis, page 162-197, which is incorporated by reference. In some example implementations, curvelets are used for efficient representation of images with sharp and curved edges. In general, curvelets are elementary oscillatory patters with effective support that obey the parabolic scaling rule.

In another example implementations, the spatial wavelets are beamlets, as discussed in Wu R. S. and Chen L., 2002, "Wave propagation and imaging using Gabor-Daubechies beamlets", Theoretical and Computational Acoustics, World Scientific, New Jersey, page 661-670, which is incorporated by reference. In general, beamlets are elementary functions obtained by decomposing a wavefield by wavelet transform along one or more spatial axes. In certain example implementations, the propagation of beamlets requires repeated decomposition and synthesis at each extrapolation level. A single beamlet cannot be propagated or imaged.

The method further includes receiving or defining one or more volumes of interest (VOIs) $115_{1...N}$. Each VOI defines a region in the output domain for seismic imaging study. In certain example implementations, the VOI is specified graphically in a 3D visualization and interpretation environment. In other example implementations, the VOI is parameterized by a set of numbers, or implicitly defined by a set of one or more geological features, geographic locations, and attribute values.

In block 125, the method includes selecting spatial wavelets from the first migrated set of spatial wavelets (block 110) that are within or slightly outside a chosen VOI, chosen from VOIs $115_{1...N}$. In some example implementations, the method may further include spatial wavelets that are close to the VOI. For example, the method may include VOIs that are slightly larger than the target area. For example, for a given VOI, after a remigration using a new velocity model, one or more of the original spatial wavelets may fall outside of the VOI. In certain implementations, the VOI may be increased (i.e., by less than a few hundred feet outside the VOI) to include one or more of these spatial wavelets that moved outside of the VOI due to the remigration. In certain example implementations, this VOI enlargement may be controlled by user input. After the spatial wavelets are selected from the first migrated set of spatial wavelets (block 125), the method in block 130 includes selecting a target set of spatial wavelets. The target set of spatial wavelets is composed of spatial wavelets from the set of unmigrated spatial wavelets (block 105) that are linked to the selected spatial wavelets from the first migrated set of spatial wavelets (block 110). The method, in block 135, further includes migrating the target set of spatial wavelets using a new velocity model chosen from velocity models $120_{1...M}$. In some example implementations, the chosen velocity model is an anisotropic velocity model. In certain example implementations, the velocity model chosen in block 135 differs from the velocity model that was used to create the first migrated set of spatial wavelets (block 110).

The process performed by blocks 125, 130, 135 may cumulatively be referred to as localized seismic imaging using spatial wavelets. The result of the localized seismic imaging process is a second migrated set of spatial wavelets (block 140). In some example implementations, the second migrated set of spatial wavelets is synthesized and saved as a hypercube of the same geometry as the VOI. The hypercube contains stacked volume, individual offset volume, and all corresponding gathers. The small hypercube may be visualized and interpreted directly or can be spliced into an existing much larger volume and/or an existing much larger hypercube for better visualization and interpretation. In certain example implementations, the second migrated set of spatial wavelets (block 140) is synthesized and is used as input into a 3D visualization and interpretation platform for a variety of applications including, but not limited to, structural, stratigraphic, geo-hazard, Amplitude Variation with Offset (AVO), tomography, and pore pressure studies.

Figure 2:
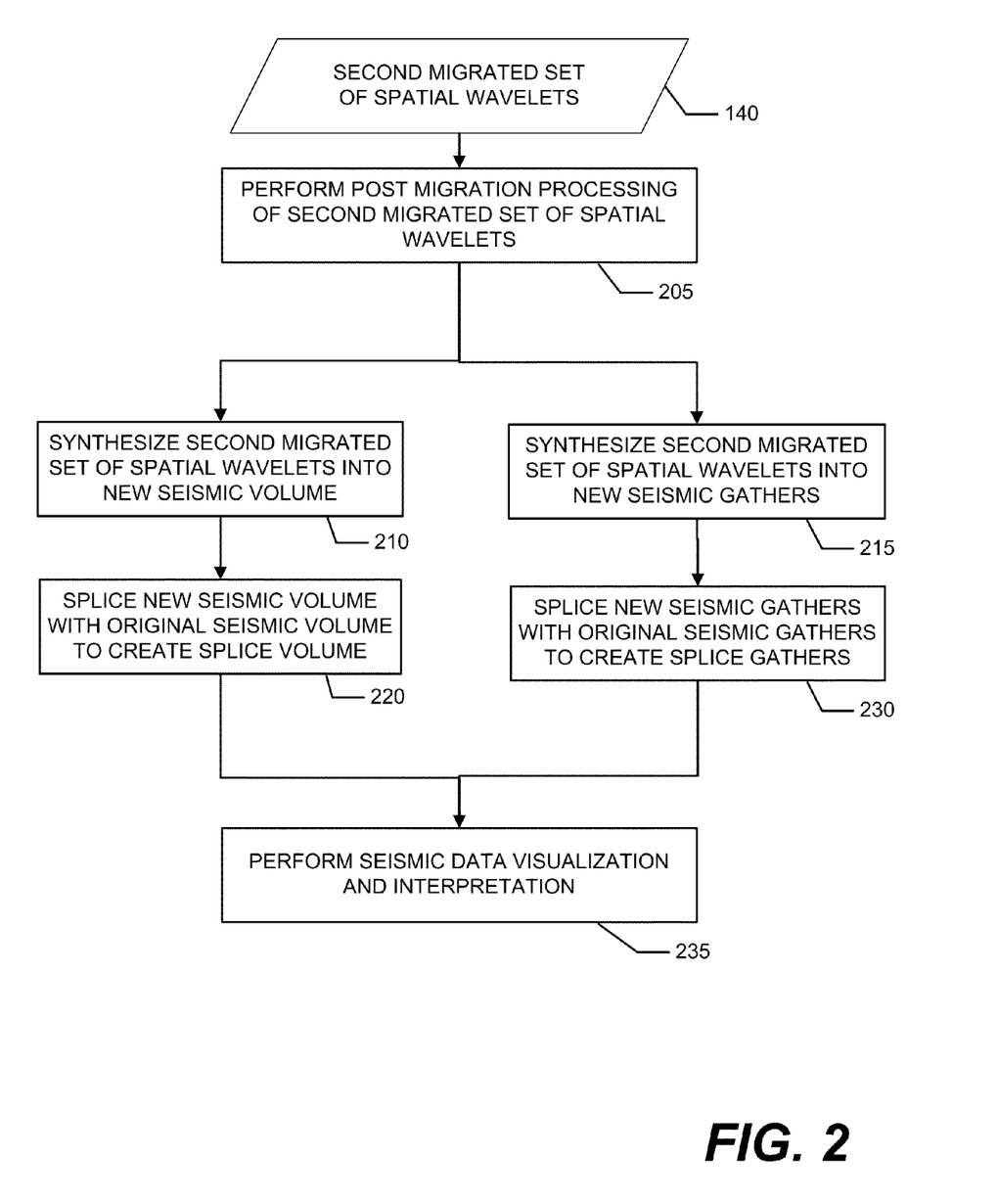

FIG. 2 shows an example method for further utilizing the second migrated set of spatial wavelets (block 140). The method includes performing post migration processing of the second migrated set of spatial wavelets (block 205). In some example implementations, this processing may include one or more of applying muting, filtering or amplitude scaling to the second migrated set of spatial wavelets. In some example implementations, the method further includes synthesizing the second migrated set of spatial wavelets into a new seismic volume (block 210). In some example implementations, the method includes synthesizing the second migrated set of spatial wavelets into new seismic gathers (block 215).

In example implementations, the new seismic volume that was determined in block 210 is spliced into the original seismic volume to create a splice volume (block 220). In certain example implementations, the method includes, in block 235, performing seismic data visualization or interpretation based on the spliced volume. This splice volume may be used for one or more of structural, stratigraphic, and geo-hazard studies.

In some example implementations, the new seismic gathers that were determined in block 215 are spliced with the original seismic gathers to create a spliced gather (block 230). In certain example implementations, the method includes, in block 235, performing seismic data visualization or interpretation based on the spliced gathers. In certain example implementations, the spliced gather is used in one or more of AVO, tomographic, and pore pressure studies.

Figure 3:
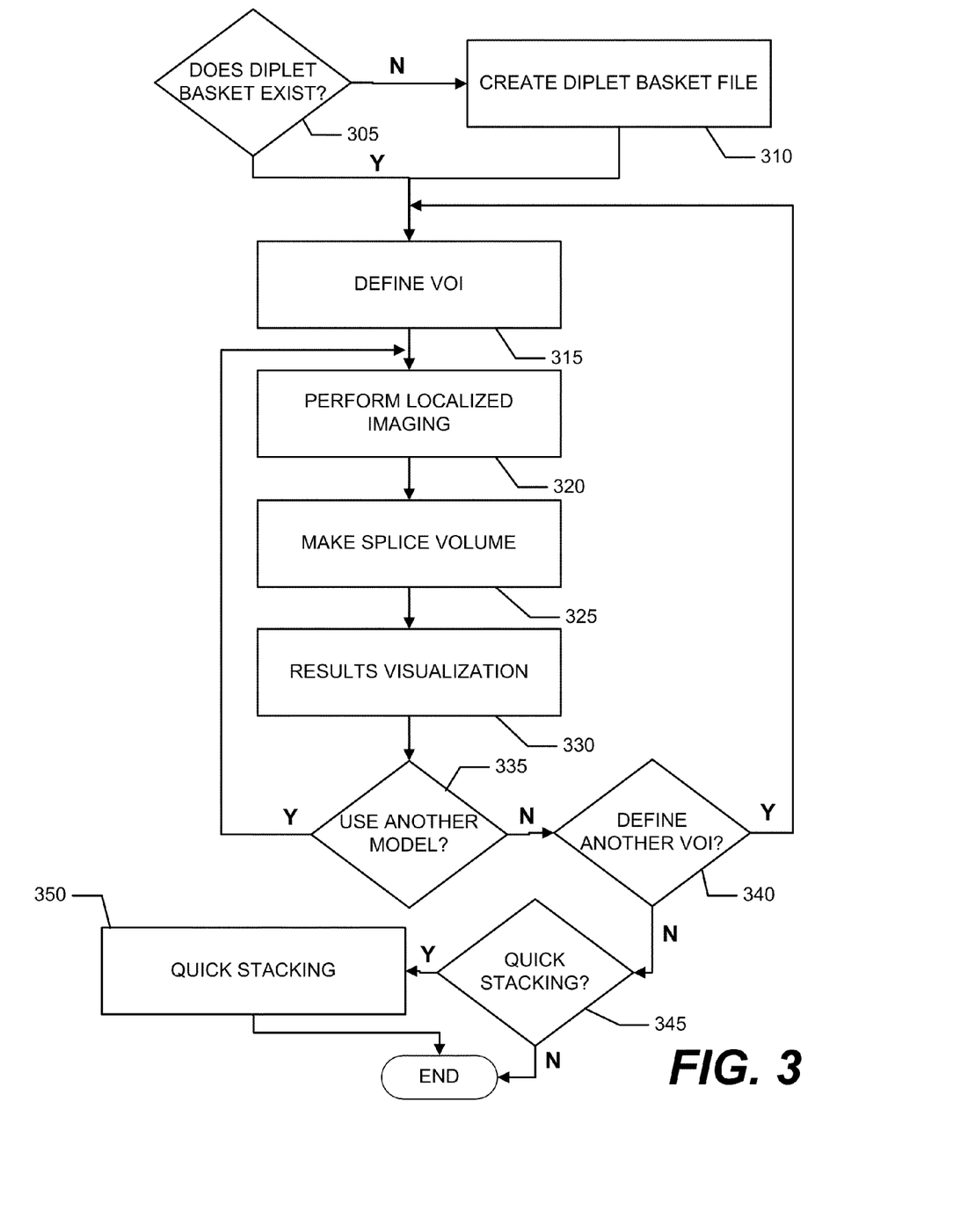
FIG. 3 is a flow chart illustrating an example imaging workflow.

FIG. 3 is a flow chart showing an example imaging method using diplets as an illustration. The method includes determining if a diplet basket exists (block 305). In some example implementations, the diplet basket is a metafile that organizes diplet files in both time and depth domains by offset. Such a file facilitates the repeated usage of diplets in subsequent experiments of different VOIs and models. Localized Seismic Imaging Using Diplets assumes the availability of a diplet basket. If the diplet basket file does not exist it is created (block 310).

In one example implementation, the diplet basket file is created (block 310) using a GUI application, entitled Diplet Basket Builder, that allows users to create a diplet basket meta-data file to hold interested diplet files. In some example implementations, the diplet basket file consists of offset information such as first offset location, offset interval, total number of offsets in addition to diplet files for different offsets in both time and depth domains. Diplet files are grouped by offset in incremental order from near offset to far offset. In some example implementations, equal distance is assumed between offsets. In some example implementations, users have the flexibility to pack a subset of offsets from all available offsets as long as these are spaced equally.

The method further includes defining one or more VOIs (block 315). In example implementations, an interactive 3D seismic interpretation tool is used to define one or more VOIs. For example the geomodeling software package GOCAD commercially available from Paradigm (formerly Earth Decision Sciences, Inc.) may be used. In order to accommodate the change of volume in the remigrated data due to the new model, it may be necessary to define an area slightly larger than that which covers the targeted events. In one example implementation, the output of the VOI definition process is a disk file containing only geometry information of the VOI.

The method further includes performing localized seismic imaging using diplets (block 320), as discussed above with respect to blocks 125, 130, and 135. In certain example implementations, the localized seismic imaging includes diplet selection, remigration, synthesizing, and conversion of Voxets to hypercube. The VOI provides the target geometry for processing. In some example implementations, depth domain diplets falling into this VOI are identified. Using the links between diplets in the depth domain and the time domain, time domain diplets that will contribute to the image in the VOI are selected. In certain example implementations, a new velocity model is provided to migrate the selected time domain diplets. In certain example implementations, remigrated depth domain diplet files are then synthesized into Voxet volumes offset by offset. The Voxet volumes have VOI and velocity model information tagged into the header for ease of reference. A hypercube defined in the VOI geometry is created from Voxet volumes of all the offsets.

The method further includes making a splice volume (block 325). In certain example implementations, to avoid repeated duplication of data, the newly created small hypercube (i.e., the new seismic volume) is inserted into the parent (large) hypercube (either the original real hypercube or a splice phantom hypercube from the last iteration of localized imaging) to create a splice hypercube. The splice hypercube displays the same values outside the VOI as found in the parent hypercube. Inside the VOI, however, data from the hypercube that was created by the localized imaging using the new model is used.

In certain example implementations, the resulting splice hypercube that is created in the current iteration is then used as a parent hypercube for the next iteration of localized imaging using a different VOI or model. This provides considerable flexibility in data management as well as time and disk space saving.

In certain example implementations, the locally migrated data is then examined visually using 2D or 3D visualization tools for quality control. If required, a quick stack on the splice hypercube can be performed and the stacked version of the image can be examined.

The method includes determining whether to use another model (block 335). If the determination in block 335 is yes, for the same VOI, the method includes a new model that can be used for another iteration of localized imaging. This may be done, for example, if a user finds the localized imaging results with the current model unsatisfactory. Similarly, the method includes determining whether to define another VOI (block 340), and if so, the method returns to block 315. If the determination of block 340 is negative, then the method includes determining whether to perform quick stacking. If so, a quick stacking is performed (block 350). In some example implementations, the output from this quick stacking is a real voxet on the disk that occupies disk space.

Figure 4:
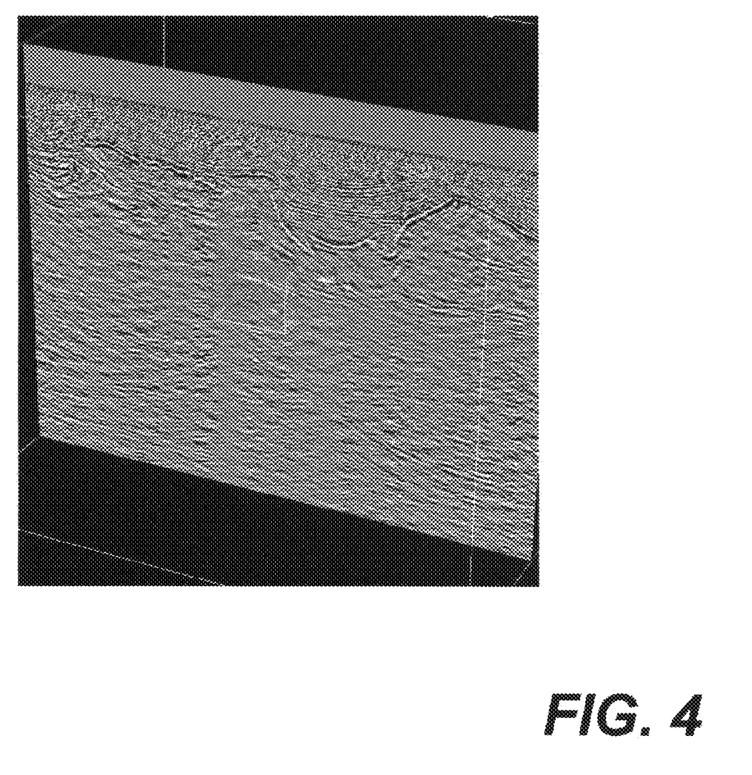
FIG. 4 shows a VOI that is a small box within a large 3D data cube.
Figure 5:
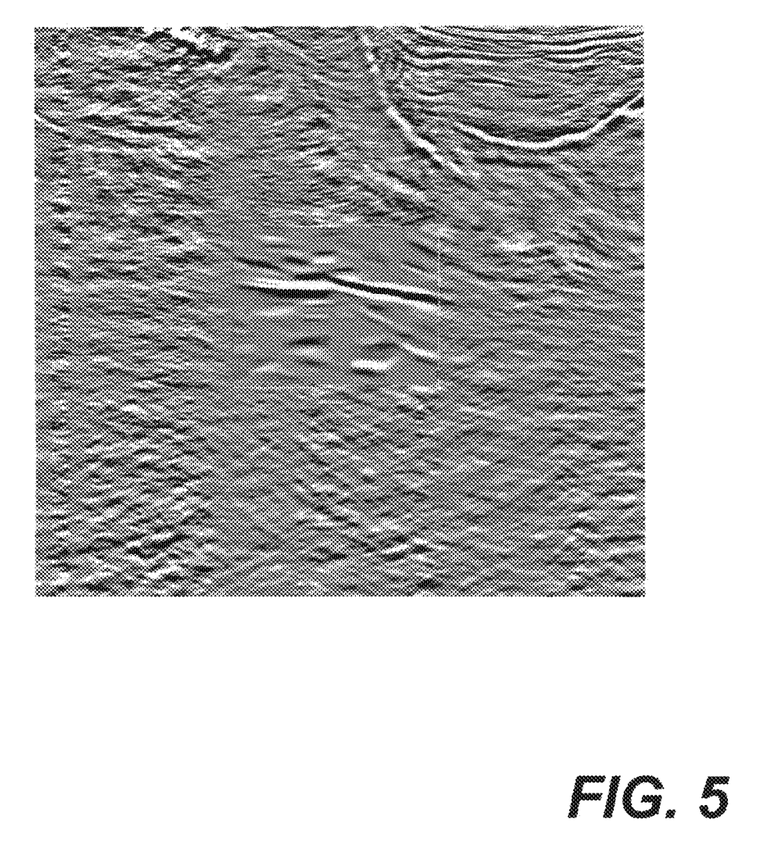
FIG. 5 shows a composite seismic image.
Figure 6:
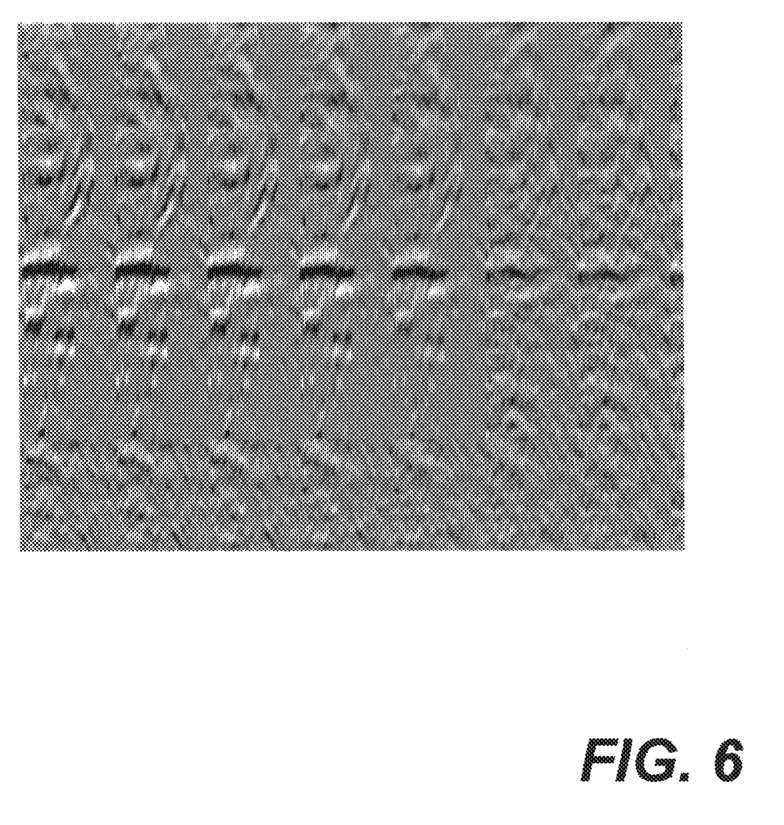
FIG. 6 shows the composite seismic image gathers.

The example visualizations shown in FIGS. 4, 5, and 6 are aided by the 3D visualization toolkit, GOCAD. FIG. 4 shows a VOI that is a small box within a large 3D data cube. FIG. 5 shows a composite seismic image with data within the VOI being updated by use of the Localized Seismic Imaging workflow with a new velocity model. The composite image is created by splicing the volume output within the VOI into the original seismic volume. FIG. 6 shows the corresponding composite seismic image gathers with data within the VOI being updated by use of the Localized Seismic Imaging workflow using the same new velocity model. The composite gathers are created by splicing the gather output within the VOI into the original seismic hypercube.

Diplets

A three-dimensional seismic volume (migrated or unmigrated) may be viewed as a superposition of individual dip components. This representation of dip components is referred to herein as a "diplet." When a volume is decomposed into a finite—but sufficient—number of diplets, the diplets can be combined to synthesize the original volume. After decomposition, an adaptive match filter can be applied to all or a subset of diplets, such that the volume output from synthesis will be as close as possible to the volume input to decomposition. An adaptive match filter can adjust both the amplitude and the wavelet phase of each diplet. Diplets include beam components plus additional direct and derived attributes. Examples of direct attributes include amplitude, coherency, and wavelet (ID). Examples of derived attributes include reflection angle, reflection azimuth, wavelet stretch, beam spread, and flag. The derived attributes are determined in demigration and migration.

In certain example implementations, each diplet is represented by information stored in a "vertex file" and a "wavelet bank". In certain example implementations, the vertex-file format is an industry standard. In general, the vertex file specifies one or more of the followings attributes for each diplet:

spatial location (e.g., x, y, and z of beam center);
spatial orientation (e.g., the inline and crossline dips: x-dip and y-dip);
source-receiver offset;
source-receiver azimuth;
reflection angle;
reflection azimuth;
wavelet ID;
amplitude;
coherency;
flag;
wavelet stretch; and
beam spread.

The extent of a diplet is its spatial footprint and is stored in the global header of the vertex file. In the process of synthesis, a diplet is sprayed out from its center location up to its extent, using a specially shaped taper. In the process of decomposition, the extent is the size of a local computation window. The extent of a diplet is wavelength-dependent. In certain example implementations, the extent of the diplet is approximately half of its wavelength.

For unmigrated (or demigrated) seismic data, z will actually be the two-way time t; the inline and crossline dips (dz/dx and dz/dy) will actually be dt/dx and dt/dy.

The offset attribute of a diplet is used to store the value in the 4th dimension (i.e., offset) of a seismic data set on which the diplets are computed. For a stack volume, this attribute should be set to zero.

The azimuth attribute of a diplet is used to store the value of seismic acquisition azimuth, which is needed for properly demigrating and (re)migrating a 3D diplet.

The wavelet ID points to a wavelet stored in the wavelet bank. The wavelet is either a time series or a depth series. The wavelet associated with the diplet may be normalized. In certain example implementations, the wavelet of a diplet is used to reconstruct a seismic volume from a collection of diplets. In certain example implementations, the wavelet of the diplet is used to perform wavelet processing for the diplet. One example of wavelet processing for a diplet is to apply migration stretch, which is dependent on both dips and reflection angle. Another example of wavelet processing is to apply band-pass filtering to the wavelet component of a diplet, while other attributes remain unchanged.

In some example implementations, the coherency and amplitude attributes of a diplet are used to eliminate a diplet if it falls below amplitude or coherence thresholds. In certain example implementations, when amplitude gain is applied to a diplet, only the amplitude attribute is scaled; other attributes and the wavelet are unchanged.

The value of the flag attribute controls whether a diplet is used or ignored in computations.

In certain example implementations, the number of diplets at a given spatial location is determined by the amplitude and coherency thresholds used in the decomposition, and may be bound by a specified maximum number of diplets per location. For example, the maximum number of diplets per location may, by default, be five. An adaptive subtraction scheme is used to scan for multiple diplets and optimize the wavelets for all diplets in a given window.

As discussed above, in certain implementations, the method includes decomposing three dimensional seismic data. A seismic volume D(x, y, z) can be expressed as a series of local linear events:

$$D(x, y, z) = \sum_j S_j(z) * \delta(z - x p_{xj} - y p_{yj}) \quad \text{(Eq. 1)}$$

where $S_j$ denotes the wavelet and $(p_{xj}, p_{yi}, -1)$ represents the normal vector for the j-th local event. For migrated data, z represents depth; for unmigrated data, it represents time.

The Fourier Transform of D(x, y, z) in the z direction can be expressed as:

$$\hat{D}(x, y, k_z) = \sum_j \hat{S}_j(k_z) e^{-ik_z(x p_{xj} + y p_{yj})}, \quad \text{(Eq. 2)}$$

where $\hat{S}_j(k_z)$ is the Fourier Transform of the wavelet $S_j(z)$. $k_z$ is the vertical wave number where z is depth or it is frequency where z is time.

If a phase shift $e^{ik_z x p_x}$ is applied and a smoothing window W(x) is convolved along the x direction:

$$\left(\hat{D}(x, y, k_z) e^{ik_z x p_x}\right) * W(x) = \quad \text{(Eq. 3)}$$
$$\sum_j \left(\hat{S}_j(k_z) e^{-ik_z y p_{yj}}\right)\left(e^{ik_z x(p_{xj} - p_x)} * W(x)\right),$$

where $p_x$ denotes some trial value. The convolution in the second parenthesis on the RHS (right hand side) is equivalent to filtering out data components whose x-dip (actually, dz/dx) deviates from $p_x$, that is, $$\left(\hat{D}(x, y, k_z) e^{ik_z x p_x}\right) * W(x) \approx \sum_{p_{xj}=p_x} \hat{S}_j(k_z) e^{-ik_z y p_{yj}}. \quad \text{(Eq. 4)}$$

Thus, when an inverse phase shift $e^{-ik_z x p_x}$ is applied:

$$\left(\left(\hat{D}(x, y, k_z) e^{ik_z x p_x}\right) * W(x)\right) e^{-ik_z x p_x} \approx \sum_{p_{xj}=p_x} \hat{S}_j(k_z) e^{ik_z(x p_x + y p_{yj})}, \quad \text{(Eq. 5)}$$

where the RHS gives the events with x-dip equal to $p_x$ at the same location in the original data. This is an approximation, since in actual practice the other dip components may not be completely eliminated.

After picking x-dips in the filtered data (using equations 2-5) for a series of x-dips, y-dips can be obtained by one-dimensional scanning. The local wavelet can then be extracted for a given x- and y-dip pair.

3D Migration of Seismic Data Using Diplets

This section describes an example method of seismic imaging with diplets. After migration, each input diplet produces an image atom (either prestack or poststack) and the superposition of all image atoms forms a complete seismic image volume.

Depth migration, which may include remigration, of a diplet that is defined in (x, y, t) space repositions the diplet to a location in (x, y, z) space. As part of the migration process, time-domain dips are converted to depth-domain dips. Also, as part of the migration or remigration process, a wavelet undergoes the stretch that is normally associated with depth migration. Conversely, demigration of a depth-domain diplet repositions the diplet to a location in (x, y, t) space. A demigration of such a diplet includes the conversion of the depth-domain dips to time-domain dips, and destretch of the wavelet associated with the diplet.

Diplet migration and diplet demigration expand the conventional four-dimensional prestack imaging space (e.g., x, y, t or z, and offset) into a seven-dimensional diplet imaging space. The seven dimensions include: x, y, z, dip in x direction (i.e., x-dip), dip in y direction (i.e., y-dip), reflection angle, and subsurface reflection azimuth. These additional dimensions provide additional opportunities for one or more of signal separation, noise attenuation, and selective subsetting and stacking based on these attributes.

Because each diplet carries both surface acquisition information and subsurface reflection information, one can easily generate angle gathers from offset gathers, and vice versa. In contrast, it is relatively difficult and costly to produce true reflection-angle gathers with conventional techniques (e.g., wave-equation migration).

The methods of the present disclosure described above may be implemented in software to run on one or more computers, where each computer includes one or more processors, a memory, and may include further data storage, one or more input devices, one or more output devices, and one or more networking devices.

The above method may be used to determine where to perform subterranean activities, such as drilling or fracturing The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the spirit and scope of the appended claims, giving full cognizance to equivalents in all respects.

What is claimed is:

1. A method for determining a seismic image of a target area, wherein the target area is defined by a volume of interest (VOI), comprising:
   receiving an unmigrated set of spatial wavelets, wherein the unmigrated set of spatial wavelets include unmigrated spatial wavelets in the time domain;
   receiving a first migrated set of spatial wavelets, wherein the first migrated set of spatial wavelets includes migrated spatial wavelets in the depth domain;
   wherein:
      each spatial wavelet comprises information about spatial location, orientation, amplitude, wavelet, acquisition configuration, and coherency; and
      each spatial wavelet in the unmigrated set of spatial wavelets is linked to a spatial wavelet in the first migrated set of spatial wavelets;
   selecting spatial wavelets from the first migrated set of spatial wavelets that are within the VOI;
   selecting a target set of spatial wavelets, the target set of spatial wavelets including spatial wavelets from the unmigrated set of spatial wavelets that are linked to the selected spatial wavelets from the first migrated set of spatial wavelets;
   migrating the target set of spatial wavelets using one or more of a velocity model to create a second migrated set of spatial wavelets;
   synthesizing the second migrated set of spatial wavelets into a new seismic volume; and
   synthesizing the second migrated set of spatial wavelets into one or more new seismic gathers;
   wherein the method is performed by at least one computer comprising one or more processors and a memory.

2. The method of claim 1, wherein the spatial wavelets are diplets.

3. The method of claim 1, wherein the spatial wavelets are Gaussian packets.

4. The method of claim 1, wherein the spatial wavelets are curvlets.

5. The method of claim 1, wherein the spatial wavelets are beamlets.

6. The method of claim 1, wherein the new velocity model is an anisotropic velocity model.

7. The method of claim 1, further comprising:
   performing post-migration processing of the second migrated set of spatial wavelets before synthesizing the seismic gathers.

8. The method of claim 7, wherein performing post-migration processing of the second migrated set of spatial wavelets comprises:
   applying one or more of muting or automatic gain control to the second migrated set of spatial wavelets.

9. The method of claim 1, further comprising:
   splicing the new seismic volume that is within the VOI and an original seismic volume to create a splice volume.

10. The method of claim 9, further comprising:
    performing interpretation based, at least in part, on the splice volume.

11. The method of claim 1, further comprising:
    splicing the new seismic gathers into one or more original seismic gathers to create one or more splice gathers.

12. A computer program, stored in a non-transitory computer readable medium storing instructions that when executed by at least one processor cause said at least one processor to:
   receive an unmigrated set of spatial wavelets, wherein the unmigrated set of spatial wavelets include unmigrated spatial wavelets in the time domain;
   receive a first migrated set of spatial wavelets, wherein the first migrated set of spatial wavelets includes migrated spatial wavelets in the depth domain;
   wherein:
      each spatial wavelet comprises information about spatial location, orientation, amplitude, wavelet, acquisition configuration, and coherency; and
      each spatial wavelet in the unmigrated set of spatial wavelets is linked to a spatial wavelet in the first migrated set of spatial wavelets;
   select spatial wavelets from the first migrated set of spatial wavelets that are within a volume of interest (VOI);
   select a target set of spatial wavelets, the target set of spatial wavelets including spatial wavelets from the unmigrated set of spatial wavelets that are linked to the selected spatial wavelets from the first migrated set of spatial wavelets;
   migrate the target set of spatial wavelets using one or more of a new velocity model to create a second migrated set of spatial wavelets;
   synthesize the second migrated set of spatial wavelets into anew seismic volume; and
   synthesize the second migrated set of spatial wavelets into one or more new seismic gathers.

13. The computer program of claim 12, wherein the spatial wavelets are diplets.

14. The computer program of claim 12, wherein the spatial wavelets are Gaussian packets.

15. The computer program of claim 12, wherein the spatial wavelets are curvlets.

16. The computer program of claim 12, wherein the spatial wavelets are beamlets.

17. The computer program of claim 12, wherein the new velocity model is an anisotropic velocity model.

18. The computer program of claim 12, further comprising executable instructions that cause the at least one processor to:
   perform post-migration processing of the second migrated set of spatial wavelets before synthesizing the seismic gathers.

19. The computer program of claim 18, wherein the executable instructions that cause the at least one processor to perform post-migration processing of the second migrated set of spatial wavelets further cause the at least one processor to:
   apply one or more of muting or automatic gain control to the second migrated set of spatial wavelets.

20. The computer program of claim 12, further comprising executable instructions that cause the at least one processor to:
   splice the new seismic volume that is within the VOI and an original seismic volume to create a splice volume.

21. The computer program of claim 20, further comprising executable instructions that cause the at least one processor to:
   perform interpretation based, at least in part, on the splice volume.

22. The computer program of claim 12, further comprising executable instructions that cause the at least one processor to:

splice the one or more new seismic gathers into one or more original seismic gathers to create one or more splice gathers.

23. A system for determining a seismic image of a target area, comprising:

one or more processors; and a memory, the memory including executable instructions for generating a multi-dimensional seismic volume, wherein the executable instructions cause the at least one processor to:

receive an unmigrated set of spatial wavelets, wherein the unmigrated set of spatial wavelets include unmigrated spatial wavelets in the time domain;

receive a first migrated set of spatial wavelets, wherein the first migrated set of spatial wavelets includes migrated spatial wavelets in the depth domain;

wherein:

each spatial wavelet comprises information about spatial location, orientation, amplitude, wavelet, acquisition configuration, and coherency; and each spatial wavelet in the unmigrated set of spatial wavelets is linked to a spatial wavelet in the first migrated set of spatial wavelets;

select spatial wavelets from the first migrated set of spatial wavelets that are within the VOI;

select a target set of spatial wavelets, the target set of spatial wavelets including spatial wavelets from the unmigrated set of spatial wavelets that are linked to the selected spatial wavelets from the first migrated set of spatial wavelets;

migrate the target set of spatial wavelets using one or more of a velocity model to create a second migrated set of spatial wavelets;

synthesize the second migrated set of spatial wavelets into a new seismic volume;

synthesize the second migrated set of spatial wavelets into one or more new seismic gathers.

* * * * *